US012034208B2

(12) United States Patent
Ji et al.

(10) Patent No.: US 12,034,208 B2
(45) Date of Patent: Jul. 9, 2024

(54) MULTI-INPUT AND MULTI-OUTPUT ANTENNA APPARATUS

(71) Applicant: KMW INC., Hwaseong-si (KR)

(72) Inventors: Kyo Sung Ji, Hwaseong-si (KR); Chang Woo Yoo, Hwaseong-si (KR); Hye Yeon Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 168 days.

(21) Appl. No.: 17/575,786

(22) Filed: Jan. 14, 2022

(65) Prior Publication Data

US 2022/0140869 A1 May 5, 2022

Related U.S. Application Data

(63) Continuation of application No. PCT/KR2020/008890, filed on Jul. 8, 2020.

(30) Foreign Application Priority Data

Jul. 17, 2019 (KR) ........................ 10-2019-0086484
Feb. 6, 2020 (KR) ........................ 10-2020-0014448

(51) Int. Cl.
*H01Q 1/42* (2006.01)
*H01Q 1/38* (2006.01)

(52) U.S. Cl.
CPC ................. *H01Q 1/42* (2013.01); *H01Q 1/38* (2013.01)

(58) Field of Classification Search
CPC .. H01Q 1/42; H01Q 1/38; H01Q 1/02; H01Q 21/061; H01Q 3/267; H01Q 3/40; H01Q 21/28; H04B 7/0452
See application file for complete search history.

(56) References Cited

U.S. PATENT DOCUMENTS 7,993,968 B2 8/2011 Gabara
2004/0203528 A1 10/2004 Ammar et al.
(Continued)

FOREIGN PATENT DOCUMENTS

CN 109937539 A 6/2019
JP 2015-519763 A 7/2015
(Continued)

OTHER PUBLICATIONS

Non-final Office Action mailed Jan. 31, 2023 from the Japanese Patent Office for Japanese Application No. 2022-502394.
(Continued)

*Primary Examiner* — Seung H Lee
(74) *Attorney, Agent, or Firm* — Insight Law Group, PLLC; Seung Lee

(57) ABSTRACT

The present invention relates to a multi-input and multi-output antenna apparatus, and in particular, the antenna apparatus provides an advantage of easy heat dissipation and calibration control by comprising: an antenna unit in which a transmission and reception substrate and an antenna substrate having a plurality of electric elements provided on one surface or the other surface thereof are stacked and arranged in the front-rear direction; a control unit in which a BB substrate and a PSU substrate having a plurality of electric elements provided on one surface or the other surface thereof are stacked and arranged in the front-rear direction, and which is provided so as to enable calibration control by using a connection between the antenna unit and a power supply or a control signal; and at least one connecting card which is provided so as to enable connection of the power supply or the control signal between the antenna unit and the control unit.

15 Claims, 12 Drawing Sheets

(56) References Cited

U.S. PATENT DOCUMENTS

| | | | | |
|---|---|---|---|---|
| 2014/0213322 | A1 | 7/2014 | Pu et al. | |
| 2018/0219277 | A1 | 8/2018 | Hirata et al. | |
| 2021/0249752 | A1* | 8/2021 | Yoo | H01Q 1/246 |

FOREIGN PATENT DOCUMENTS

| | | | |
|---|---|---|---|
| JP | 2018-129846 | A | 8/2018 |
| KR | 10-2005-0092400 | A | 9/2005 |
| KR | 10-1571394 | B1 | 11/2015 |
| KR | 10-2018-0055772 | A | 5/2018 |
| KR | 10-1854309 | B1 | 5/2018 |
| KR | 10-2019-0065816 | A | 6/2019 |
| KR | 10-2019-0068486 | A | 6/2019 |
| WO | 2018/093173 | A | 5/2018 |

OTHER PUBLICATIONS

International Search Report mailed Oct. 20, 2020 for International Application No. PCT/KR2020/008890 and its English translation.

Notice of Allowance mailed Nov. 20, 2020 for Korean Application No. 10-2020-0014448.

Extended European Search Report mailed Jul. 7, 2023 from the European Patent Office for European Application No. 20840158.8.

* cited by examiner

MULTI-INPUT AND MULTI-OUTPUT ANTENNA APPARATUS

CROSS-REFERENCE TO RELATED APPLICATIONS

This application is a Continuation of International Application No. PCT/KR2020/008890, filed on Jul. 8, 2020, which claims the benefit of and priority to Korean Patent Application Nos. 10-2019-0086484, filed on Jul. 17, 2019; and 10-2020-0014448, filed on Feb. 6, 2020, the disclosure of which are herein incorporated by reference in their entirety.

TECHNICAL FIELD

The present disclosure relates to a multi-input and multi-output antenna apparatus, and more particularly, to a multi-input and multi-output antenna apparatus which can realize a high output and has an excellent heat dissipation characteristic.

BACKGROUND ART

A wireless communication technology, for example, a multiple input multiple output (MIMO) technology is a technology which significantly increases a data transmission capacity by using multiple antennas, and is a spatial multiplexing scheme in which a transmitter transmits different data through transmission antennas and a receiver distinguishes between transmission data through proper signal processing.

Accordingly, as the numbers of transmission and reception antennas are simultaneously increased, more data can be transmitted because a channel capacity is increased. For example, if the number of antennas is increased to 10, about 10 times the channel capacity can be secured by using the same frequency band compared to a current single antenna system.

In 4G LTE-advanced, up to 8 antennas are used. In pre-5G stage or 5G stage, a product on which 64 or 128 antennas are mounted is now being developed. In 5G, it is expected that base station equipment having a large number of antennas will be used. This is also called full dimension (FD)-MIMO because 3D-beamforming is made possible if a massive MIMO technology is introduced.

In the massive MIMO technology, as the number of ANTS is increased, the numbers of corresponding transmitters and filters are also increased. Due to a lease cost for an installation place or spatial restriction, it is necessary to make RF parts (antenna/filter/power amplifier/transceiver, etc.) small and lightweight, and a high output is necessary for massive MIMO for coverage extension. Consumption power and the amount of generated heat attributable to such a high output act as a negative factor in reducing weight and a size.

In particular, when a MIMO antenna in which modules having RF elements and digital elements implemented therein are combined as a stack structure is installed in a limited space, in order to maximize installation easiness or space utilization, the necessity for compactness and a small-sized design for a plurality of layers constituting the MIMO antenna is emerging. In this case, there is a need for a design regarding a new heat dissipation structure for heat generated from communication parts mounted on the plurality of layers.

DISCLOSURE

Technical Problem

The present disclosure has been made to solve the aforementioned problems, and an object of the present disclosure is to provide a multi-input and multi-output antenna apparatus which can realize a high output and has an excellent heat dissipation characteristic.

Furthermore, another object of the present disclosure is to provide a multi-input and multi-output antenna apparatus having a reduced product size.

Furthermore, still another object of the present disclosure is to provide a multi-input and multi-output antenna apparatus including a power supply module having excellent compatibility and applicability.

Furthermore, still another object of the present disclosure is to provide a multi-input and multi-output antenna apparatus having a small-sized and lightweight stack structure.

Furthermore, still another object of the present disclosure is to provide an assembly method capable of minimizing the amount of assembly tolerance accumulated which may occur when multiple filters are assembled and a structure capable of uniformly delivering a fastening force necessary to secure an electrical characteristic of the filter.

Furthermore, the present disclosure is to provide a calibration scheme capable of performing TX/RX calibration through one calibration hardware element and performing calibration in real time while operating in the MIMO antenna operating according to a time division duplex (TDD) scheme.

Objects of the present disclosure are not limited to the aforementioned object, and the other objects not described above may be evidently understood from the following description by those skilled in the art.

Technical Solution

An embodiment of a multi-input and multi-output antenna apparatus according to the present disclosure includes an antenna unit in which an antenna substrate having multiple electric elements provided on one surface or another surface thereof and a transmission and reception substrate are stacked and disposed in forward and backward directions thereof, a control unit in which a PSU substrate having multiple electric elements provided on one surface or another surface thereof and a BB substrate are stacked and disposed in forward and backward directions thereof and which is provided to enable calibration control by using a connection for power feeding and a control signal with the antenna unit, and at least one connecting card provided to enable the connection for power feeding and a control signal between the antenna unit and the control unit.

In this case, the at least one connecting card may have a front end part thereof connected to the transmission and reception substrate of the antenna unit and a reat end part connected to the BB substrate of the control unit.

Furthermore, the at least one connecting card may have a front end part coupled with the transmission and reception substrate of the antenna unit through a socket and a rear end part coupled with the BB substrate of the control unit through a socket.

Furthermore, a front end socket part having a socket terminal form and coupled with a front correspondence socket part provided in the transmission and reception substrate of the antenna unit may be provided at the front end part of the at least one connecting card. A rear end socket part having a socket terminal form and coupled with a rear correspondence socket part provided in the BB substrate of the control unit may be provided at the rear end part of the at least one connecting card.

Furthermore, a coupling direction of each of the front correspondence socket part and the front end socket part, and the rear correspondence socket part and the rear end socket part may be forward and backward directions.

Furthermore, the antenna unit may further include an antenna housing having the antenna substrate and the transmission and reception substrate stacked and disposed therein and a radome panel shielding a front of the antenna housing. The control unit may further include a main housing having the PSU substrate and the BB substrate stacked and disposed therein and a cover housing shielding a front of the main housing. Antenna unit-side card penetration holes through which the front end part of the at least one connecting card penetrates in forward and backward directions thereof may be formed in the back of the antenna housing. Control unit-side card penetration holes through which the rear end part of the at least one connecting card penetrate in forward and backward directions thereof may be formed in a front of the cover housing.

Furthermore, a coupling direction of each of the front correspondence socket part and the front end socket part, and the rear correspondence socket part and the rear end socket part may be a horizontal direction.

Furthermore, the at least one connecting card may be assembled in a form in which the front end socket part is coupled with the front correspondence socket part of the antenna unit and the rear end socket part is then coupled with the rear correspondence socket part of the control unit.

Furthermore, the antenna unit may further include an antenna housing having the antenna substrate and the transmission and reception substrate stacked and disposed therein and a radome panel shielding a front of the antenna housing. The control unit may further include a main housing having the PSU substrate and the BB substrate stacked and disposed therein and a cover housing shielding a front of the main housing. Antenna unit-side card penetration holes through which front end socket parts provided in the front end part of the at least one connecting card penetrate in a horizontal direction, respectively, may be formed in a side of the antenna housing. Control unit-side card penetration holes through which rear end socket parts provided in the rear end part of the at least one connecting card penetrate in the horizontal direction, respectively, may be formed in a side of the main housing.

Furthermore, a coupling direction of each of the front correspondence socket part and the front end socket part, and the rear correspondence socket part and the rear end socket part may be a horizontal direction.

Furthermore, the at least one connecting card may be assembled in a form in which the front end socket part and the rear end socket part are simultaneously coupled with the front correspondence socket part of the antenna unit and the rear correspondence socket part of the control unit.

Furthermore, the antenna unit may further include an antenna housing in which the antenna substrate and the transmission and reception substrate are stacked and disposed in a front-side board installation space provided in a front thereof and multiple heat dissipation pins are integrated and formed in a back thereof. The control unit may further include a main housing in which the PSU substrate and the BB substrate are stacked and disposed in a rear-side board installation space provided in a front thereof, and a cover housing in which multiple cover housing heat dissipation pins are integrated and formed in a front thereof in a way to shield the front. The at least one connecting card may be provided to connect the transmission and reception substrate and the BB substrate between the antenna housing and the cover housing isolated from each other at a given distance.

Furthermore, a front-side card slot boss part provided to more backward protrude than the multiple heat dissipation pins and an antenna unit-side card penetration hole penetrating the front-side card slot boss part in forward and backward directions thereof may be formed in the antenna housing. A rear-side card slot boss part provided to more forward protrude than the cover housing heat dissipation pins and a control unit-side card penetration hole penetrating the rear-side card slot boss part in forward and backward directions thereof may be formed in the cover housing. The at least one connecting card may have a front end part inserted into the antenna unit-side card penetration hole through the antenna unit-side card penetration hole in forward and backward directions thereof, and may have a rear end part inserted into the control unit-side card penetration hole through the control unit-side card penetration hole in forward and backward directions thereof.

Furthermore, the at least one connecting card may be disposed to be hidden from the outside by the front-side card slot boss part having the antenna unit-side card penetration hole provided therein and the rear-side card slot boss part having the control unit-side card penetration hole provided therein.

Furthermore, an antenna unit-side card penetration hole penetrating the antenna housing in the horizontal direction may be formed in the side of the antenna housing. A control unit-side card penetration hole penetrating the main housing in the horizontal direction may be formed in the side of the main housing. A front end socket part provided at the front end part of the at least one connecting card may be inserted into the antenna unit-side card penetration hole through the antenna unit-side card penetration hole in the horizontal direction. A rear end socket part provided at the rear end part of the at least one connecting card may be inserted into the control unit-side card penetration hole through the control unit-side card penetration hole in the horizontal direction.

Furthermore, the at least one connecting card may be disposed on the side of the antenna housing and the side of the main housing in a way to be externally exposed.

Advantageous Effects

According to an embodiment of the multi-input and multi-output antenna apparatus according to the present disclosure, there is an effect in that heat dissipation can be selectively concentrated and performed on heat dissipation elements having a large amount of heat generated with respect to the outside so that the heat dissipation elements have more efficient heat dissipation performance, and there is an effect in that a 5G multi-input and multi-output antenna apparatus can be additionally easily installed because the size of a produce is reduced.

Figure 1A:
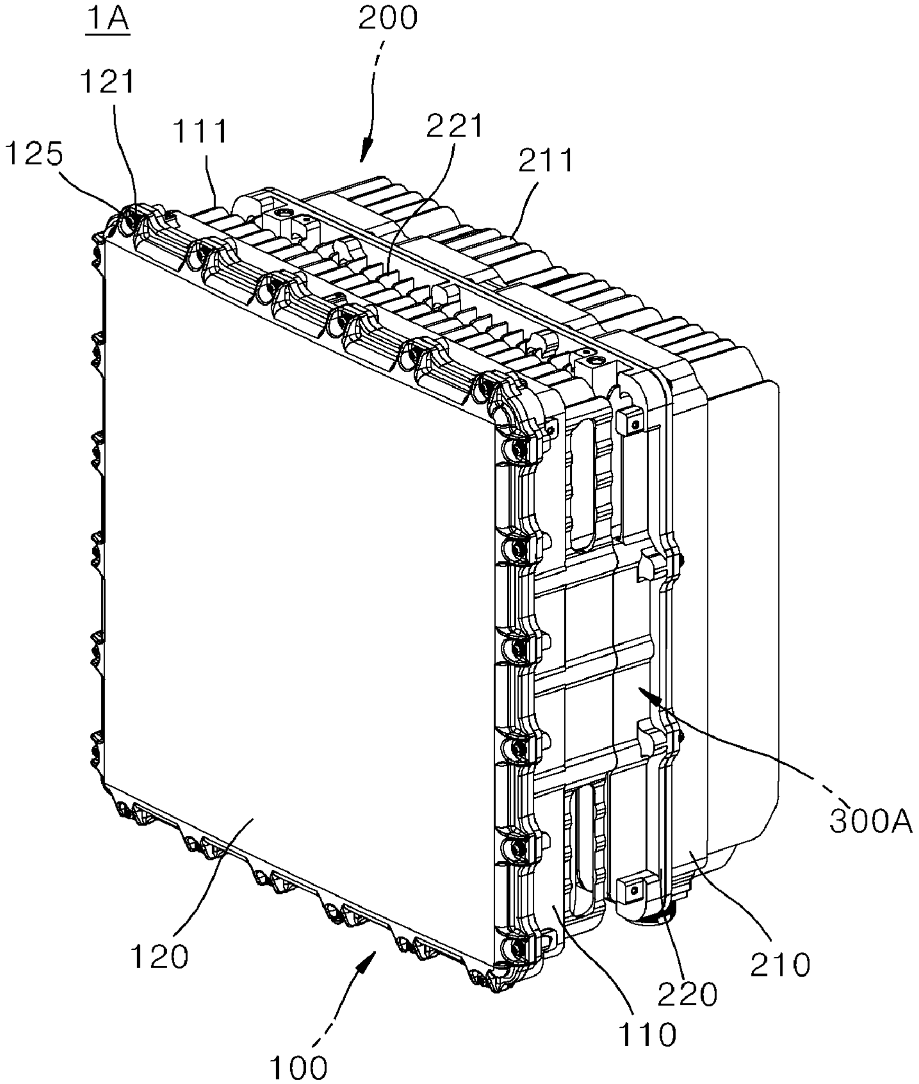
FIG. 1*a* is a perspective view illustrating a multi-input and multi-output antenna apparatus according to an embodiment of the present disclosure.

DESCRIPTION OF REFERENCE NUMERALS 1A,1B: multi-input and multi-output antenna apparatus
100: antenna unit
110: antenna housing 111: multiple heat dissipation pins
115: heat contact part 117A: antenna unit-side card penetration hole
120: radome panel 130: antenna substrate
140: transmission and reception substrate 170: front-side board installation space
200: control unit 210: main housing
211: main housing heat dissipation pin 220: cover housing
221: cover housing heat dissipation pin 227A: control unit-side card penetration hole
230: PSU substrate 240: BB substrate
270: rear-side board installation space

BEST MODE

Hereinafter, embodiments of a multi-input and multi-output antenna apparatus according to the present disclosure are described in detail with reference to the accompanying drawings. In adding reference numerals to the elements of each drawing, it should be noted that the same elements have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

Furthermore, in describing elements of an embodiment of the present disclosure, terms, such as a first, a second A, B, (a), and (b), may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which an embodiment pertains, unless defined otherwise in the specification.

Terms, such as those commonly used and defined in dictionaries, should be construed as having the same meanings as those in the context of a related technology, and are not construed as being ideal or excessively formal unless explicitly defined otherwise in the specification.

Figure 1B:
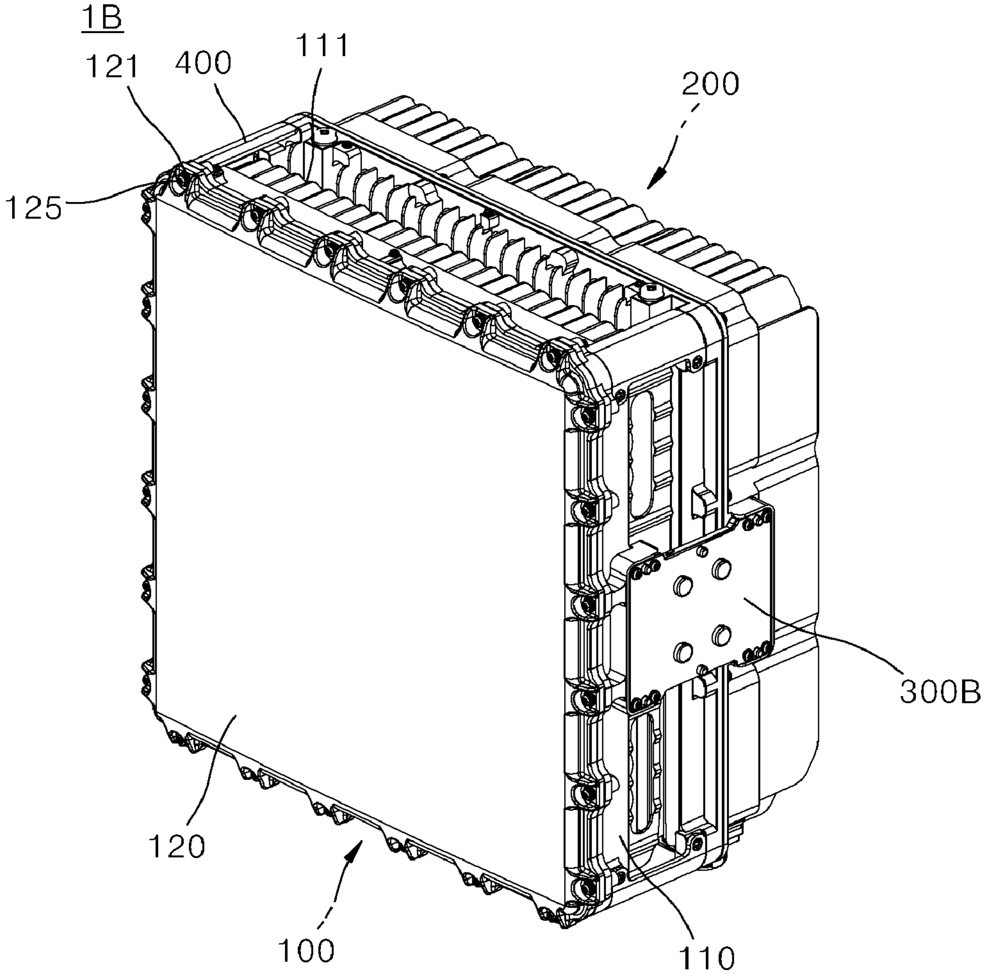
FIG. 1*b* is a perspective view illustrating a multi-input and multi-output antenna apparatus according to another embodiment of the present disclosure.
Figure 2A:
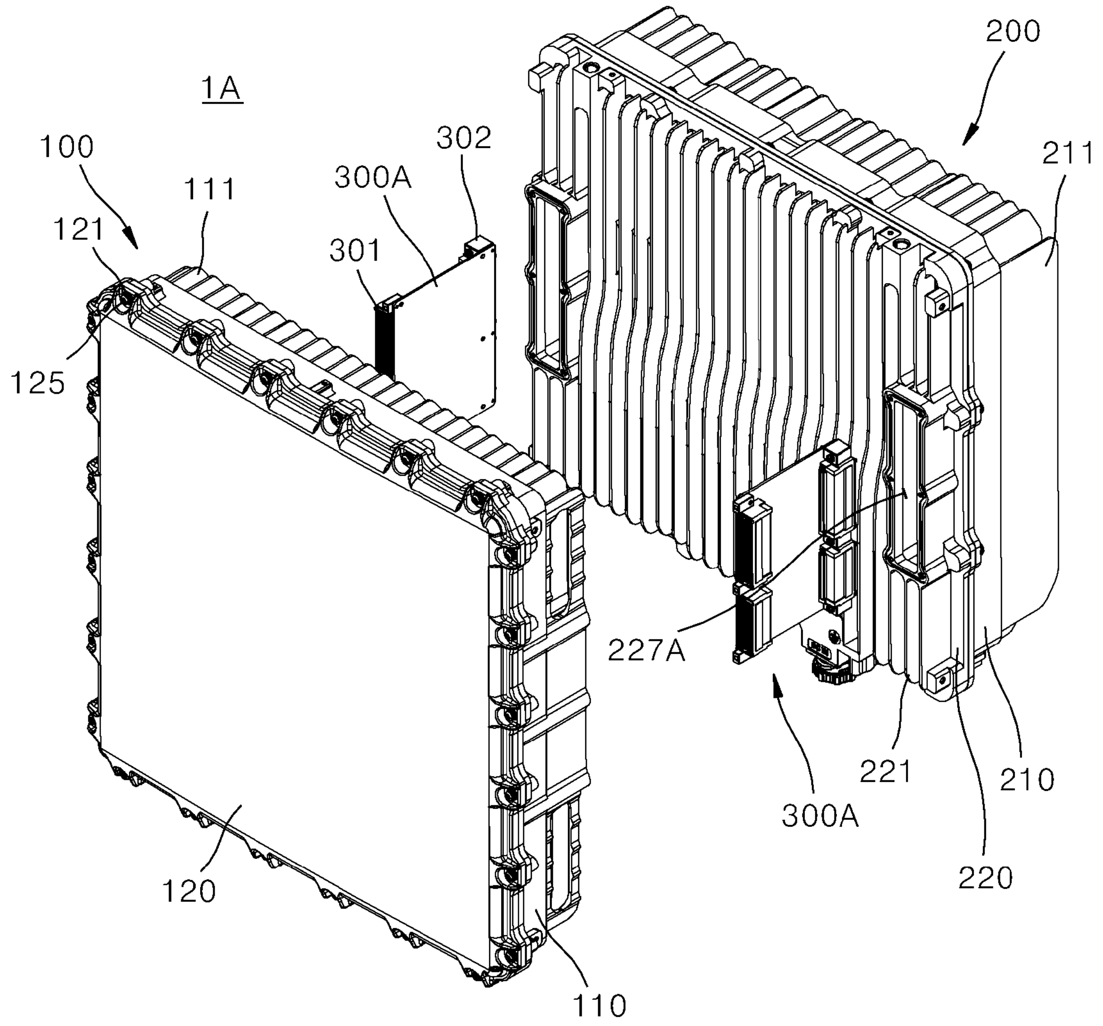
FIG. 2*a* is an exploded perspective view illustrating a first embodiment of a connecting card among elements of FIG. 1*a*.
Figure 2B:
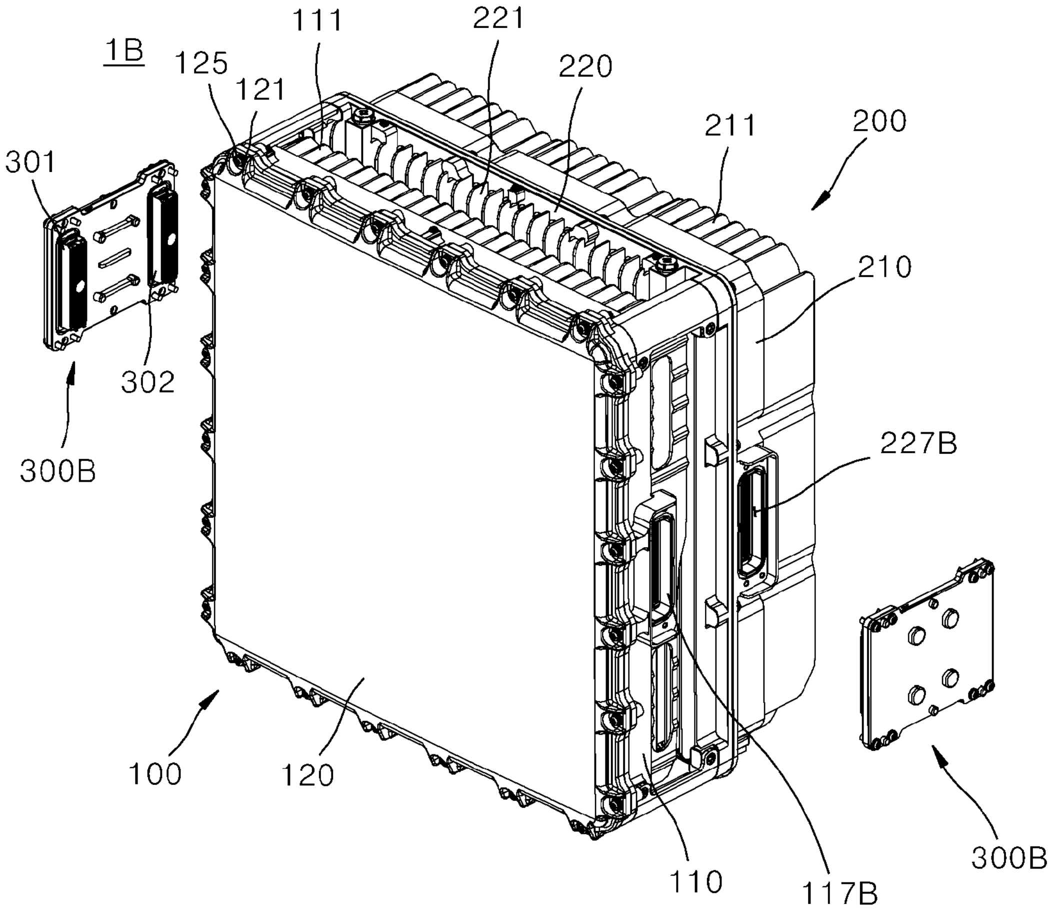
FIG. 2*b* is an exploded perspective view illustrating a second embodiment of the connecting card among elements of FIG. 1*b*.
Figure 3A:
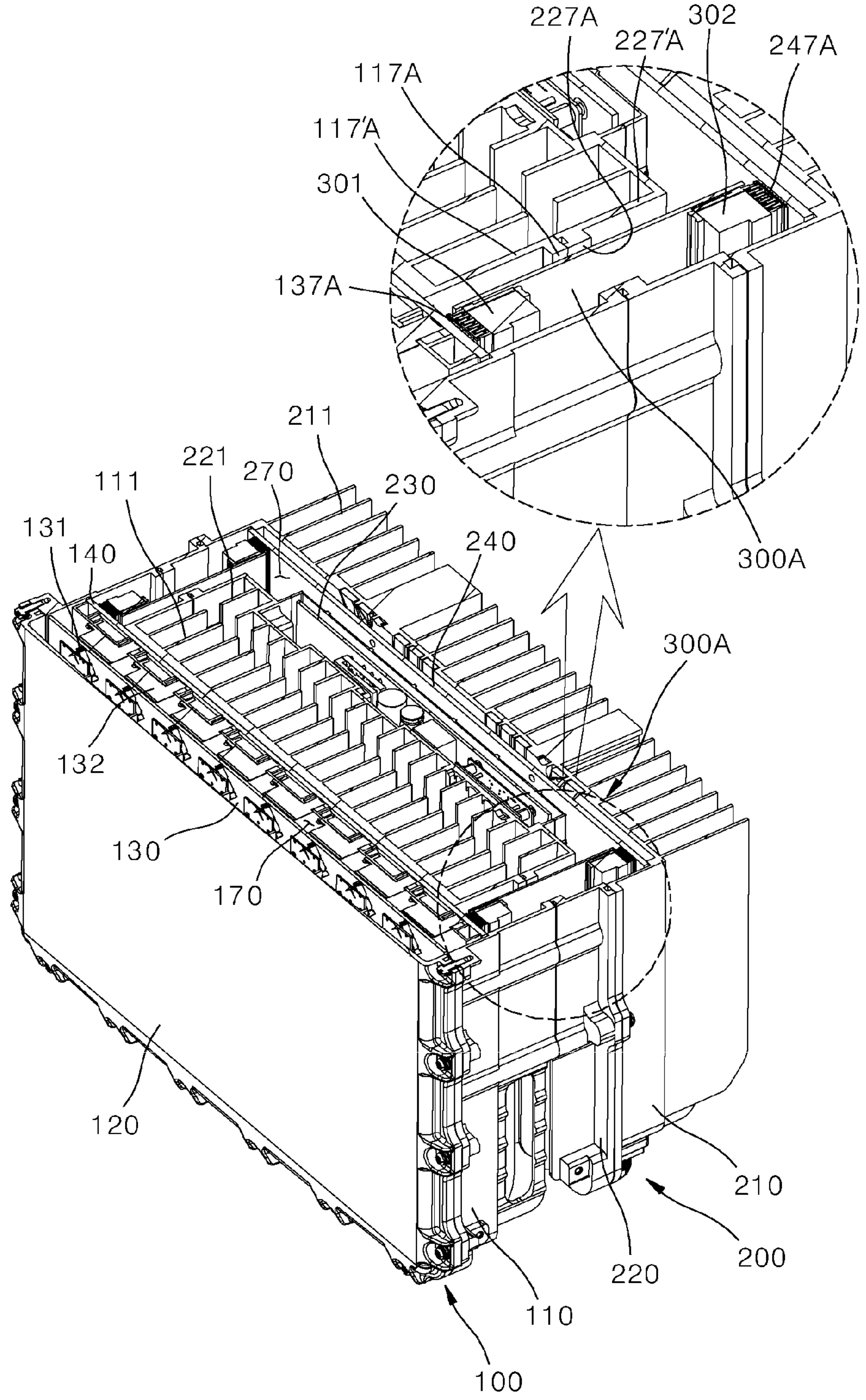
FIG. 3*a* is a cutaway perspective view and partial enlarged view of FIG. 2*a*.
Figure 3B:
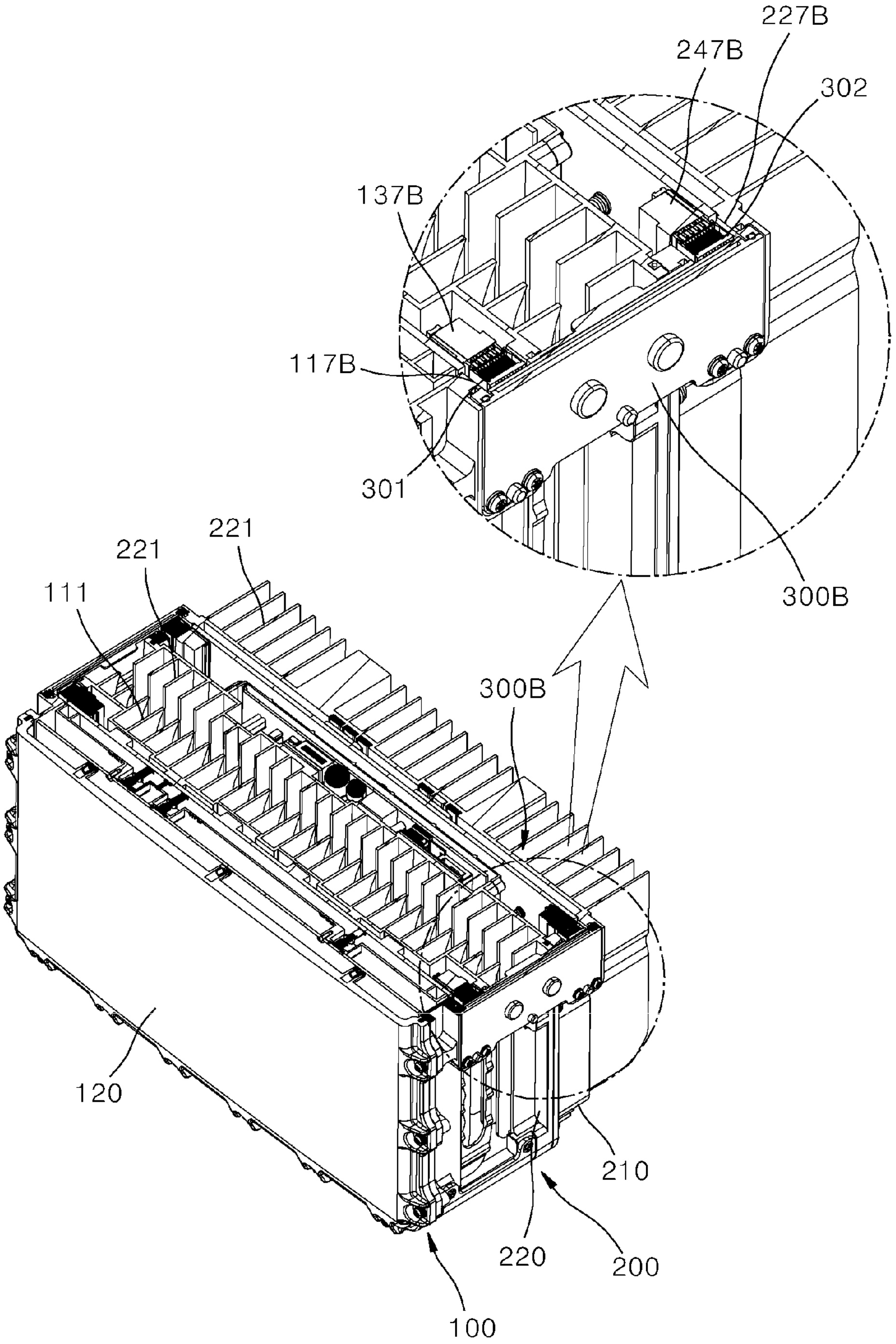
FIG. 3*b* is a cutaway perspective view and partial enlarged view of FIG. 2*b*.

FIG. 1*a* is a perspective view illustrating a multi-input and multi-output antenna apparatus according to an embodiment of the present disclosure. FIG. 1*b* is a perspective view illustrating a multi-input and multi-output antenna apparatus according to another embodiment of the present disclosure. FIG. 2*a* is an exploded perspective view illustrating a first embodiment of a connecting card among elements of FIG. 1*a*. FIG. 2*b* is an exploded perspective view illustrating a second embodiment of the connecting card among elements of FIG. 1*b*. FIG. 3*a* is a cutaway perspective view and partial enlarged view of FIG. 2*a*. FIG. 3*b* is a cutaway perspective view and partial enlarged view of FIG. 2*b*.

As reference is made to FIGS. 1*a* to 3*b*, a multi-input and multi-output antenna apparatus 1A, 1B according to an embodiment of the present disclosure includes an antenna unit 100 including antenna boards 130 and 140 equipped with multiple electric elements (refer to reference numerals 131 and 141, 132 and 143 in FIGS. 4 and 5), a control unit 200 including mother boards (refer to reference numerals 230 and 240 in FIGS. 6 to 9) provided to enable power feeding or calibration control through a control signal, and a connecting card 300A, 300B provided to enable a connection for power feeding and a control signal between the antenna unit 100 and the control unit 200.

More specifically, as reference is made to FIGS. 1*a* to 3*b*, the antenna unit 100 may include an antenna housing 110 having the antenna boards 130 and 140 embedded therein and a radome panel 120 provided to shield an opened front of the antenna housing 110, wherein the antenna housing 110 and the radome panel 120 are perpendicularly disposed at a front part of the antenna unit 100 relatively compared to the control unit 200 that is described later.

Furthermore, as reference is made to FIGS. 1*a* to 3*b*, the control unit 200 may include a main housing 210 having the mother boards 230 and 240 embedded therein and a cover housing 220 provided to shield an opened front of the main housing 210, wherein the main housing 210 and the cover housing 220 are perpendicularly disposed at a rear part of the control unit 200 relatively compared to the antenna unit 100 and disposed to be isolated from each other at a given interval.

Meanwhile, as reference is made to FIGS. 2*a* and 2*b*, the connecting card 300A, 300B may be disposed between the antenna housing 110 at a front thereof and the main housing 210 at a rear thereof, and may have a front end part inserted into the antenna housing 110 and a rear end part thereof inserted into the main housing 210. In this case, the front end part of the connecting card 300A, 300B may be connected to the antenna boards 130 and 140 provided within the antenna housing 110 through signals. The rear end part of the connecting card 300A, 300B may be connected to the mother boards 230 and 240 of the main housing 210 through signals. Accordingly, the connecting card 300A, 300B may function to enable power feeding or signal control between the antenna boards 130 and 140 and the mother boards 230 and 240.

A front-side board installation space 170 in which the antenna boards 130 and 140 can be embedded may be formed in the antenna housing 110. The front-side board installation space 170 may be closed by the radome panel 120 combined with a front end part of the antenna housing 110.

Furthermore, multiple heat dissipation pins 111 for efficiently backward dissipating heat generated toward the front-side board installation space 170 may be integrated and formed on the rear side of the antenna housing 110. The multiple heat dissipation pins 111 may be formed to protrude backward, that is, toward the control unit 200 at a given length, at the back of the antenna housing 110.

Furthermore, the multiple heat dissipation pins 111 may be provided in a rib form that is up and down lengthily formed. Adjacent heat dissipation pins 111 may be disposed to be isolated from each other in the horizontal direction at a given length.

As reference is made to FIG. 3*a*, a front-side card slot boss part 117'A in which a pair of antenna unit-side card penetration holes 117A that are opened in forward and backward directions thereof is provided may be provided at a left end part and right end part of the back of the antenna housing 110. The front end part (refer to reference numeral 301 in FIGS. 1*a* to 3*b*) of the connecting card 300A, 300B may be inserted into and penetrate through the antenna unit-side card penetration holes 117A.

The front-side card slot boss part 117'A may be up and down lengthily formed, and may be formed to more backward protrude than rear ends of the multiple heat dissipation pins 111 formed on the rear side of the antenna housing 110. A rear end of the front-side card slot boss part 117'A formed as described above comes into contact with a front end of a rear-side card slot boss part 227'A protruded toward the front of the cover housing 220 disposed to cover the front of the main housing 210 that is described later, thereby preventing the connecting card 300A, 300B disposed within the main housing 210 from being exposed to the outside. This is more specifically described later.

The antenna unit-side card penetration holes 117A may be formed in the front-side card slot boss part 117'A in a way to have a size through which at least the front end part of the connecting card 300A, 300B penetrates, and may be formed in the form of a hole that is up and down lengthily opened.

The front-side card slot boss part 117'A and the antenna unit-side card penetration holes 117A may be provided at the left end part and right end part of the antenna housing 110 on the rear side thereof, respectively. Accordingly, as reference is made to FIG. 2*a*, the connecting card 300A, 300B may be provided as a pair, including a left connecting card that connects power feeding or control signals through the antenna unit-side card penetration holes 117A provided at the left end part of the antenna housing 110 and a right connecting card that connects power feeding or signals through the antenna unit-side card penetration holes 117A provided at the right end part or right surface of the antenna housing 110.

A rear-side board installation space 270 in which the mother boards 230 and 240 including a PSU (Power Supply Unit) substrate 230 and a BB (Baseband)substrate 240 therein can be embedded may be formed in the main housing 210. The rear-side board installation space 270 may be closed by the cover housing 220 combined with a front end part of the main housing 210.

Multiple main housing heat dissipation pins 211 for backward dissipating heat generated toward the rear-side board installation space 270 may be integrated and formed on the rear side of the main housing 210. Likewise, multiple cover housing heat dissipation pins 221 for forward dissipating heat generated toward the rear-side board installation space 270 may be integrated and formed on the front side of the cover housing 220. The structures of the multiple main housing heat dissipation pins 211 and the multiple cover housing heat dissipation pins 221 are almost similar to that of the multiple heat dissipation pins 111 formed on the rear side of the antenna housing 110, and detailed structures are omitted.

As reference is made to FIG. 3*a*, the rear-side card slot boss part 227'A in which a pair of control unit-side card penetration holes 227A that are opened in forward and backward directions thereof is provided may be provided at a left end part and right end part of the front of the cover housing 220, respectively. The rear end part (refer to reference numeral 302 in FIGS. 1*a* to 3*b*) of the connecting card 300A may be inserted into and penetrate through the control unit-side card penetration holes 227A.

Furthermore, the rear-side card slot boss part 227'A may be formed in a form corresponding to the front-side card slot boss part 117'A, and may be formed to more forward protrude than the front end of the multiple cover housing heat dissipation pins 221 formed on the front side of the cover housing 220.

Accordingly, the front end of the rear-side card slot boss part 227'A may come into contact with the rear end of the front-side card slot boss part 117'A more backward protruding than the multiple heat dissipation pins 111 formed on the rear side of the antenna housing 110, thereby preventing the connecting card 300A from being exposed to the outside as described above.

That is, as reference is made to the enlarged view of FIG. 3*a*, when the antenna unit 100 and the control unit 200 are combined, the rear end of the front-side card slot boss part 117'A and the front end of the rear-side card slot boss part 227'A make the antenna unit-side card penetration holes 117A and the control unit-side card penetration hole 227A communicate with each other by coming into contact with each other, but form a closed space in the state in which the front-side card slot boss part 117'A and the rear-side card slot boss part 227'A have been cut off from the outside. The front end part and rear end part of the connecting card 300A are disposed through the space. Accordingly, the front end part of the connecting card 300A may be connected to the antenna boards 130 and 140 of the antenna unit 100, and the rear end part of the connecting card 300A may be connected to the mother boards 230 and 240.

As described above, in the multi-input and multi-output antenna apparatus according to the present disclosure, the connecting card 300A according to the first embodiment is disposed in a way to be hidden from the outside by the front-side card slot boss part 117'A in which the antenna unit-side card penetration holes 117A is provided and the rear-side card slot boss part 227'A in which the control unit-side card penetration hole 227A is provided. Accordingly, there is an advantage in that a protection cover (reference numeral not indicated) is not necessary unlike in the connecting card 300B that is described later according to a second embodiment.

As already described with reference to FIGS. 1*a*, 2*a* and 3*a*, the connecting card 300A may be implemented as the first embodiment, and may be implemented as the second embodiment different from the first embodiment as reference is made to FIGS. 1*b*, 2*b* and 3*b*. The connecting card 300A of the first embodiment and the connecting card 300B of the second embodiment may have the following differences.

First, as reference is made to FIGS. 1*a*, 2*a* and 3*a*, the connecting card 300A of the first embodiment may be disposed between the back of the antenna housing 110 and the front of the main housing 210, and may have the front end part thereof forward inserted and disposed at a given depth on the rear side of the antenna housing 110 and the rear end part thereof backward inserted and disposed at a given depth on the front side of the main housing 210 including the cover housing 220. In contrast, as reference is made to FIGS. 1*b*, 2*b* and 3*b*, the connecting card 300B of the second embodiment may be disposed between the side of the antenna housing 110 and the side of the main housing 210, and may have the front end part thereof disposed to cover a part of the side of the antenna housing 110 and the rear end part thereof disposed to cover a part of the side of the main housing 210 including the cover housing 220. That is, the connecting card 300A of the first embodiment may be understood as being disposed in an embedded type, but the connecting card 300B of the second embodiment may be understood as being disposed in an external type.

Second, the front end socket part 301 having a 120-pin socket terminal form may be provided at the front end part of the connecting card 300A, 300B to which the antenna boards 130 and 140 are connected. The rear end socket part 302 having a 120-pin socket terminal form 302 may be provided at the rear end part of the connecting card 300A, 300B to which the mother board is connected. Furthermore, front correspondence socket parts 137A may be provided in the antenna boards 130 and 140 connected to the front end socket part 301 of the connecting card 300A, 300B. A rear correspondence socket part 247A may be provided in the mother boards 230 and 240 connected to the rear end socket part 302 of the connecting card 300A, 300B.

In this case, the front end socket part 301 and rear end socket part 302 of the connecting card 300A of the first embodiment and the front correspondence socket parts 137A and the rear correspondence socket parts 247A coupled therewith by sockets, respectively, may be provided to have a coupling direction thereof in a form that is coupled in forward and backward directions thereof. In contrast, the front end socket part 301 and rear end socket part 302 of the connecting card 300B of the second embodiment and a front correspondence socket part 137B and a rear correspondence socket part 247B coupled therewith by sockets, respectively, may be provided to have a coupling direction thereof in a form coupled in the horizontal direction.

That is, the connecting card 300A of the first embodiment may be assembled in a form in which the front end socket part 301 is coupled with the front correspondence socket part 137A of the antenna unit 100 and the rear end socket part 302 is then coupled with the rear correspondence socket part 247A of the control unit 200.

In contrast, the connecting card 300B of the second embodiment may be assembled in a form in which the front end socket part 301 and the rear end socket part 302 are simultaneously coupled with the front correspondence socket part 137B of the antenna unit 100 and the rear correspondence socket part 247B of the control unit 200.

The connecting card 300A of the first embodiment is provided to be fully hidden from the outside by the antenna housing 110 and the main housing 210, and has an advantage in that external intrusion can be minimized, but has a disadvantage in that the antenna housing 110 and the main housing 210 must be separated upon repair and replacement thereof. The connecting card 300B of the second embodiment has a disadvantage in that external intrusion cannot be fully blocked in that the connecting card 300B is exposed to the outside of sides of the antenna housing 110 and the main housing 210, but an advantage in that the antenna housing 110 and the main housing 210 do not need to be separated upon repair and replacement thereof.

The connecting card 300B according to the second embodiment may further include a protection cover (reference numeral not indicated) for preventing contamination attributable to an external alien substance.

Meanwhile, as reference is made to FIGS. 1*b*, 2*b* and 3*b*, the embodiment 1B of the multi-input and multi-output antenna apparatus according to the present disclosure may further include multiple edge coupling panels 400 disposed at the end of each edge of the antenna housing 110 of the antenna unit 100 and the end of each edge of the cover housing 220 of the control unit 200, respectively, and mediating a mutual connection. The multiple edge coupling panels 400 can firmly couple the antenna unit 100 and the control unit 200 together by using at least four fastening screws (reference numeral not indicated) alternately fastened in a direction of 90 degrees.

In the embodiment 1A, 1B of the multi-input and multi-output antenna apparatus according to the present disclosure, the remaining elements except elements related to the connecting cards 300A and 300B implemented as the first embodiment and the second embodiment are the same. Accordingly, the remaining elements not described above will be described as a structure implemented as the connecting card 300A according to the first embodiment.

Figure 4:
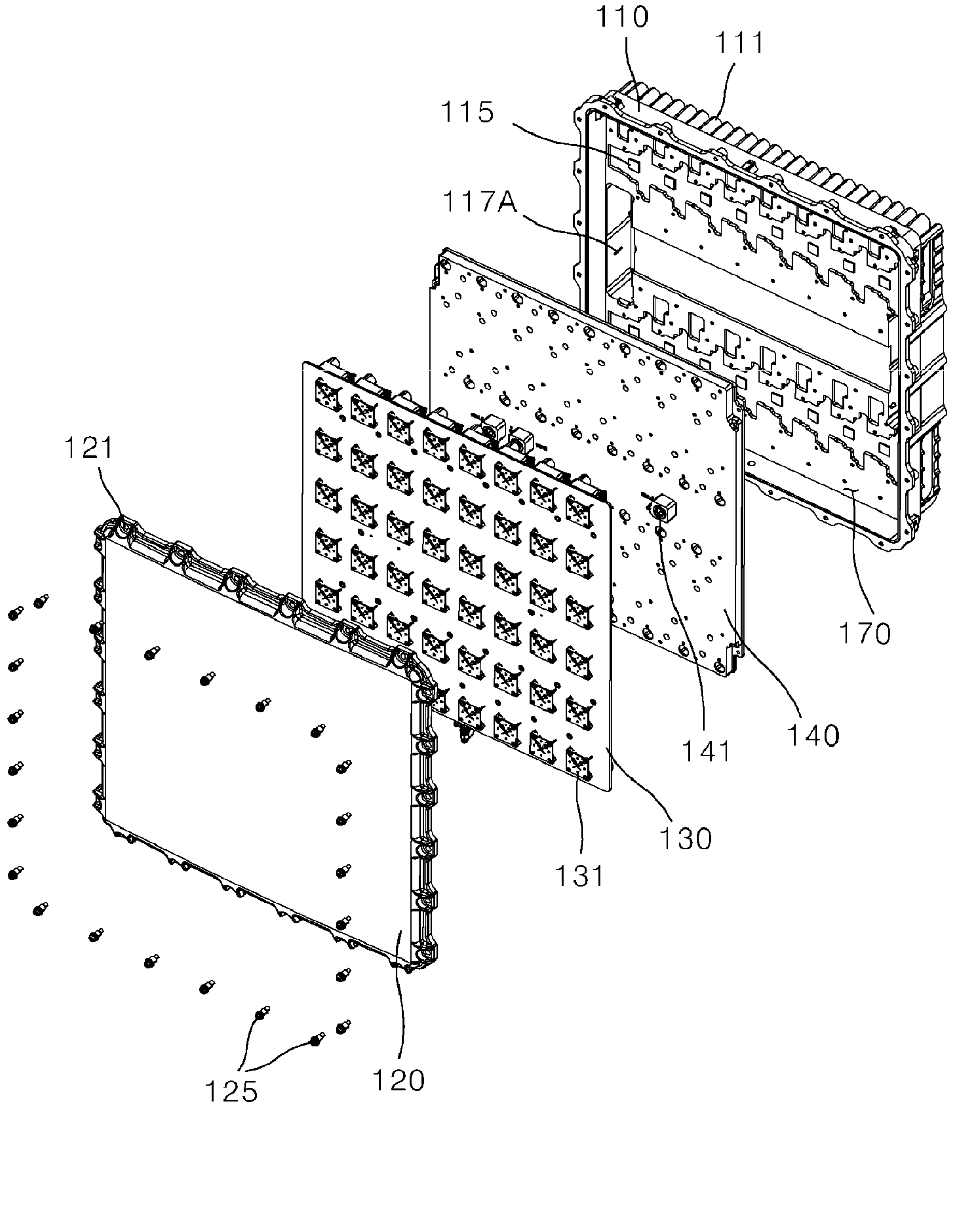
FIGS. 4 and 5 are exploded perspective views of an antenna unit among elements of the multi-input and multi-output antenna apparatus according to the present disclosure.
Figure 5:
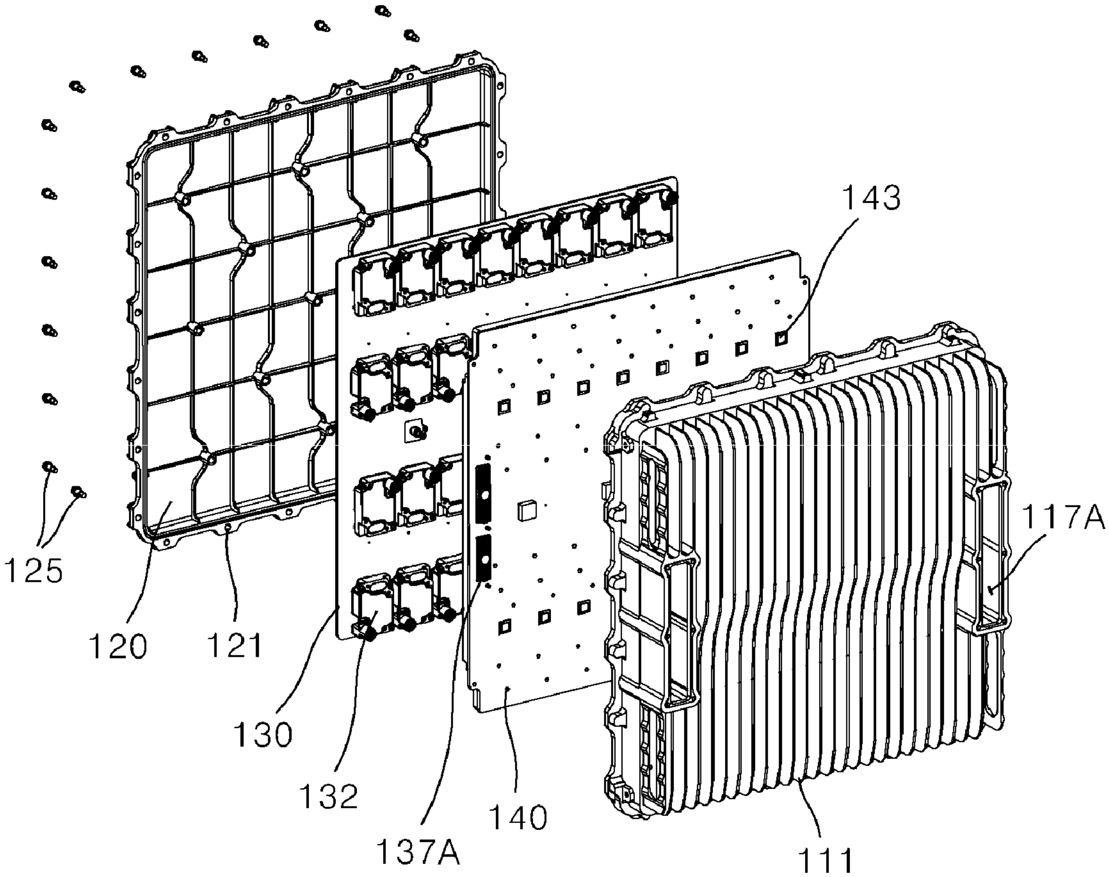

FIGS. 4 and 5 are exploded perspective views of the antenna unit among elements of the multi-input and multi-output antenna apparatus according to the present disclosure.

In the multi-input and multi-output antenna apparatus 1A according to the present disclosure, as reference is made to FIGS. 4 and 5, the antenna unit 100 may include the antenna housing 110 having the multiple heat dissipation pins 111 integrated and formed at the back thereof.

Further, the antenna unit 100 may further include the antenna boards 130 and 140, including a transmission and reception substrate 140 which is seated in the front-side board installation space 170 of the antenna housing 110 in a way to be stacked in forward and backward directions thereof and which has multiple first elements 141 formed in the front thereof and multiple second elements 143 mounted on the back thereof and an antenna substrate 130 having multiple antenna elements 131 mounted on the front thereof and multiple antenna filters 132 (micro bellows filters (MBFs) mounted on the back thereof.

Furthermore, the antenna unit 100 may further include the radome panel 120 in which multiple fastening screws 125 are fastened to the front end part of the antenna housing 110 through an operation of penetrating fastening holes 121, thus shielding the front-side board installation space 170.

Multiple heat contact parts 115 that come into contact with the multiple second elements 143, respectively, and protrude so that heat is delivered may be provided on an inner surface that forms the front-side board installation space 170 of the antenna housing 110. Heat dissipation performance can be greatly improved because heat generated from the multiple second elements 143 is directly thermally conducted through the heat contact parts 115 and dissipated to the multiple heat dissipation pins 111 integrated and formed with the back of the antenna housing 110.

Furthermore, as reference is made to FIGS. 4 and 5, the antenna unit-side card penetration holes 117A may be formed in the left end part and right end part of the antenna housing 110, respectively, so that the front end part of the connecting card 300A is introduced into the antenna housing 110 through the antenna housing 110 in forward and backward directions thereof. The front correspondence socket parts 137A may be provided in the left end part and right end part of the back of the transmission and reception substrate 140, respectively, among the antenna boards 130 and 140 so that the front end socket parts 301 provided as a pair and provided at the respective front end parts of the connecting card 300A are connected thereto through pins.

However, FIGS. 4 and 5 illustrate configurations relating to the connecting card 300A according to the first embodiment. A configuration of the connecting card 300B according to the second embodiment for which reference is made in FIGS. 1*b*, 2*b* and 3*b* has the following differences.

That is, as reference is made to FIGS. 1*b*, 2*b* and 3*b*, the antenna unit-side card penetration hole 117B may be formed in a left surface and right surface of the antenna housing 110, respectively, so that the front end socket part 301 provided at the front end part of the connecting card 300B is introduced into the antenna housing 110 through the antenna housing 110 in a horizontal direction thereof. The front correspondence socket parts 137B may be provided at the left end part and right end part of the transmission and reception substrate 140, respectively, among the antenna boards 130 and 140 so that the front end socket parts 301 provided as a pair and provided at the respective front end parts of the connecting card 300B are connected thereto through pins.

The antenna unit 100 having such a configuration functions to enable the transmission and reception of a frequency having a desired band by operating based on power feeding or a control signal supplied by the control unit 200 through the medium of the connecting card 300A.

Figure 6:
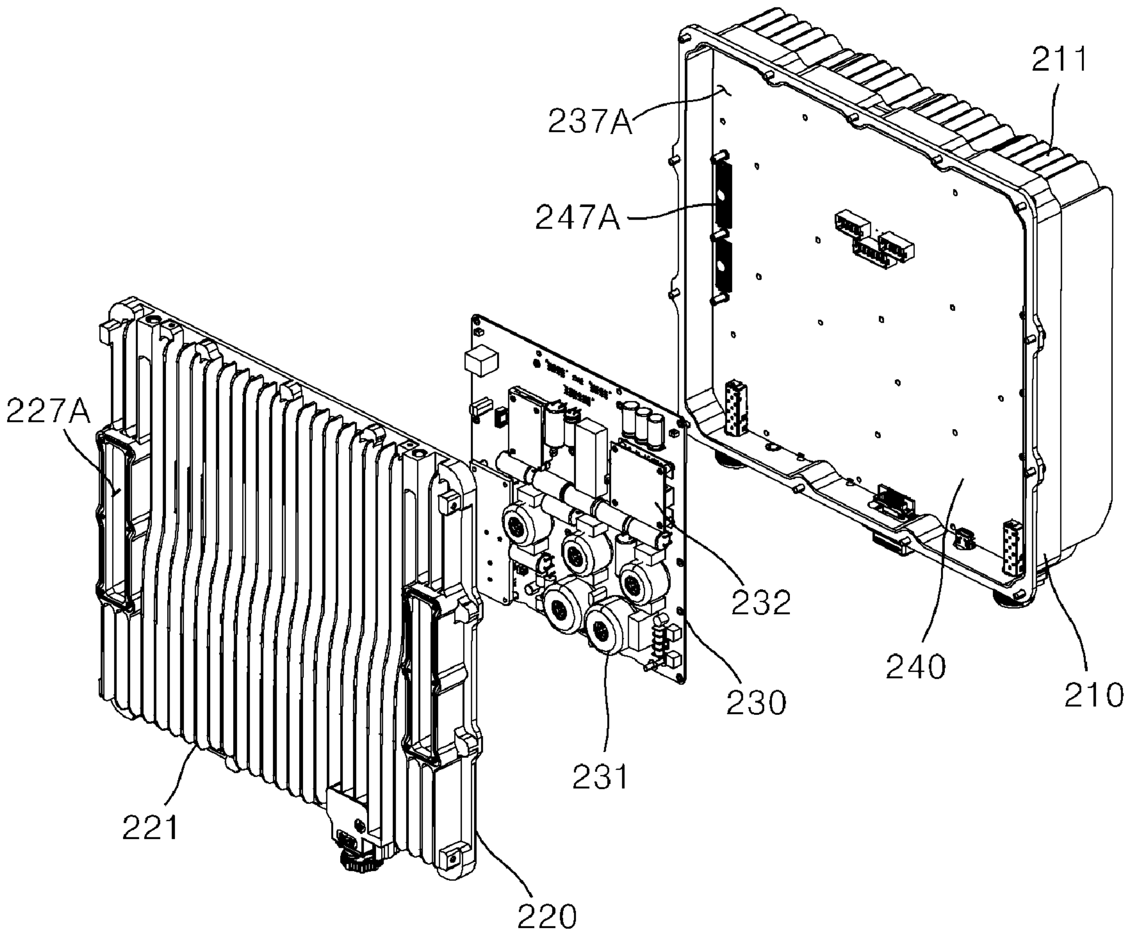
FIGS. 6 and 7 are front-side exploded perspective views illustrating a control unit among the elements of the multi-input and multi-output antenna apparatus according to the present disclosure.
Figure 7:
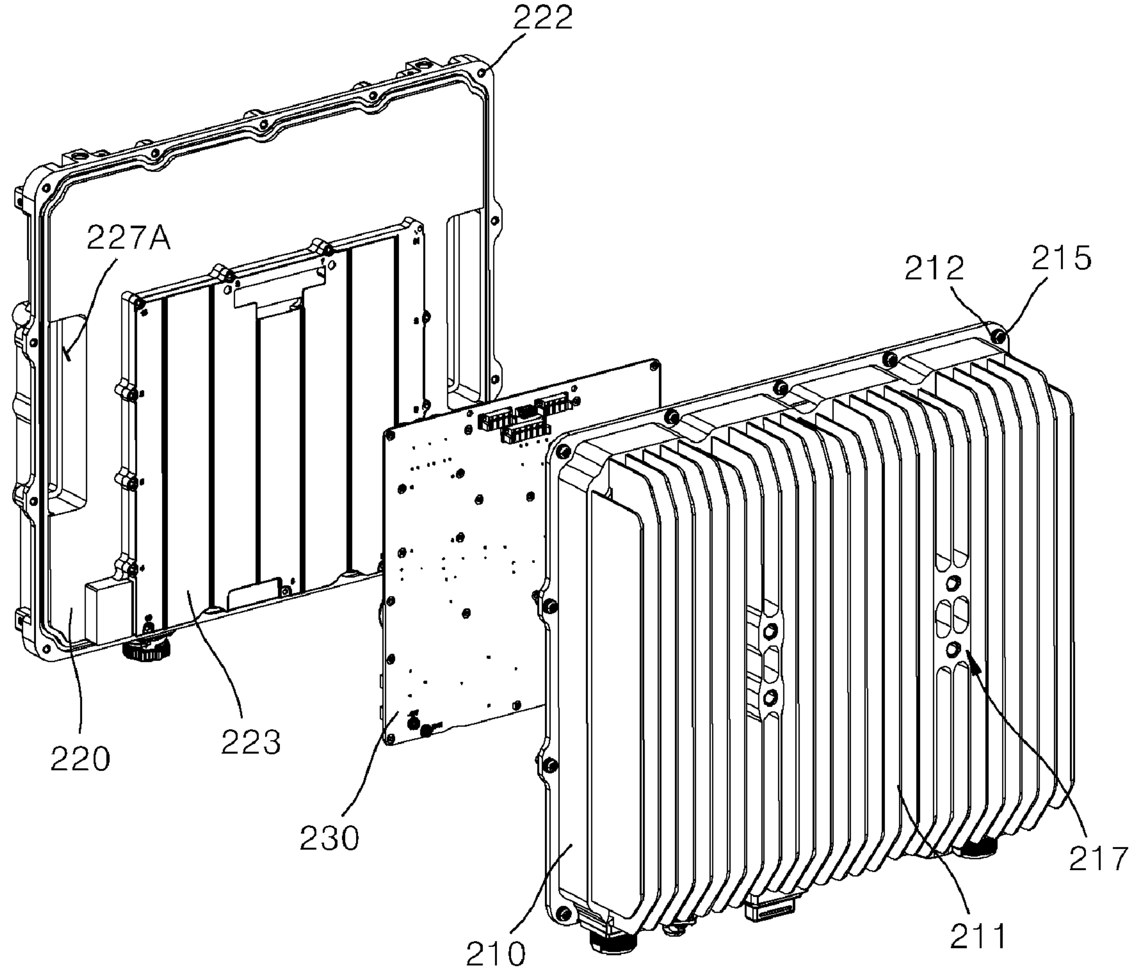
Figure 8:
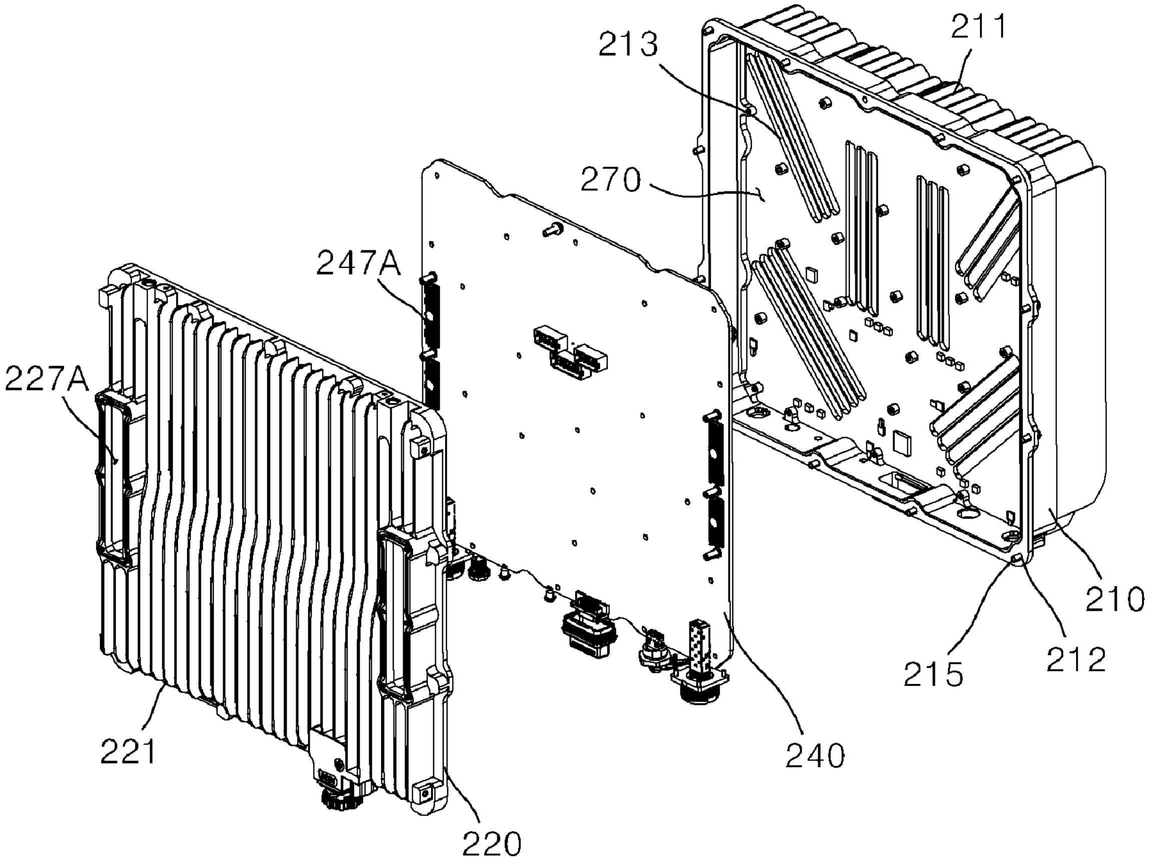
FIGS. 8 and 9 are rear-side exploded perspective views illustrating the control unit among the elements of the multi-input and multi-output antenna apparatus according to the present disclosure.
Figure 9:
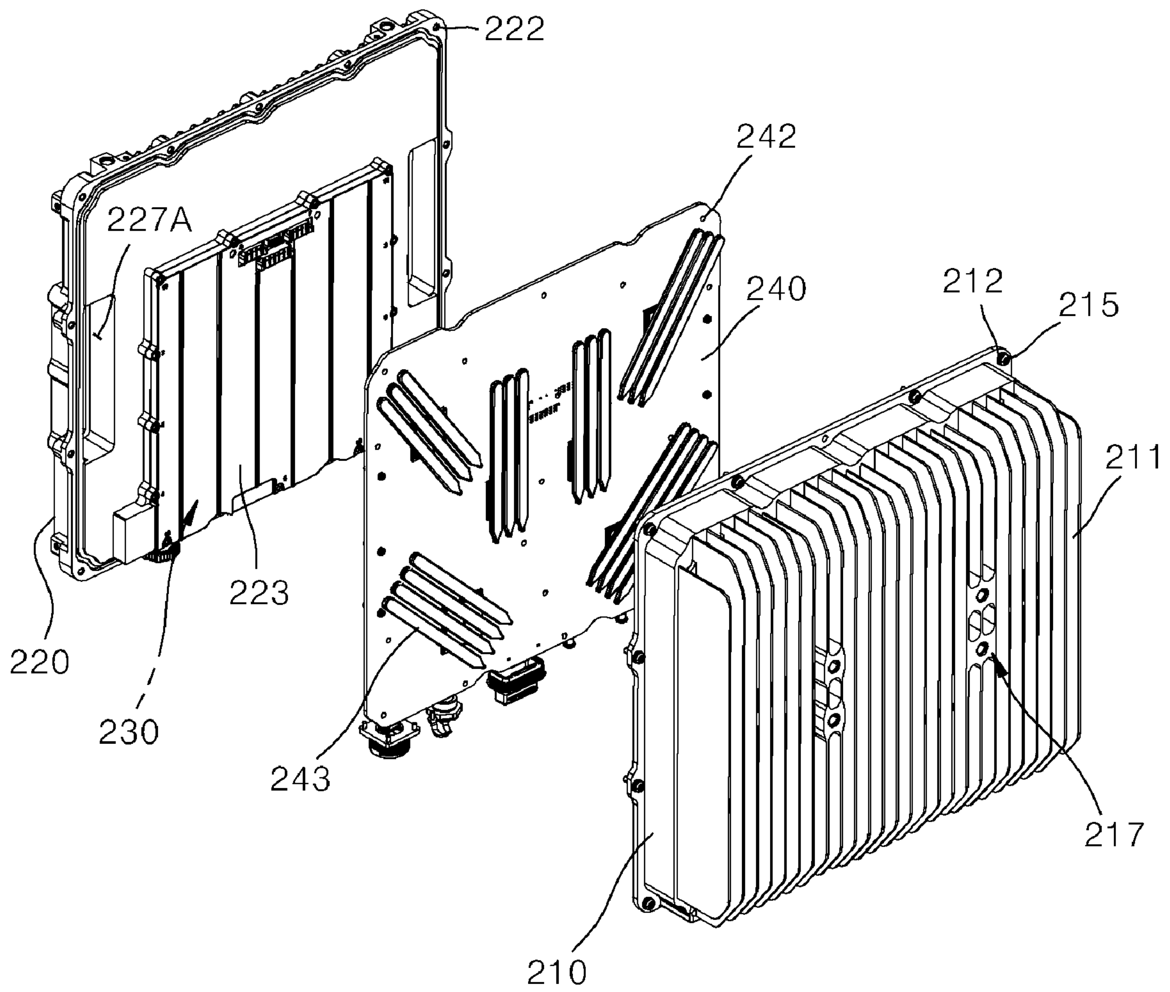

FIGS. 6 and 7 are front-side exploded perspective views illustrating the control unit among the elements of the multi-input and multi-output antenna apparatus according to the present disclosure. FIGS. 8 and 9 are rear-side exploded perspective views illustrating the control unit among the elements of the multi-input and multi-output antenna apparatus according to the present disclosure.

In the multi-input and multi-output antenna apparatus 1A according to the present disclosure, as reference is made to FIGS. 6 to 9, the control unit 200 includes the main housing 210 having the multiple main housing heat dissipation pins 211 integrated and formed at the back thereof and the rear-side board installation space 270 formed in the front thereof and the cover housing 220 coupled with the front of the main housing 210 and having the multiple cover housing heat dissipation pins 221 integrated and formed in the front thereof.

The main housing 210 and the cover housing 220 may be firmly coupled together by multiple screw through holes 212 formed along edges of the main housing 210 and multiple fastening screws 215 fastened to multiple screw fastening holes 222 formed among edges of the cover housing 220.

The mother boards 230 and 240, including the PSU substrate 230 having multiple power supply electric elements, such as a surge coil 231, mounted on the front thereof and functioning as power supply and the BB (Baseband) substrate 240 stacked and disposed on the rear side of the PSU substrate 230 and functioning as calibration control by applying power feeding or a control signal to the antenna unit 100, may be provided between the main housing 210 and the cover housing 220. The PSU substrate 230 may be formed to have a smaller width than the BB substrate 240 in order to prevent interference of the connection of the rear end part of the connecting card 300A with the BB substrate 240.

The PSU substrate 230 may be fixed and disposed in an installation space (reference numeral not indicated) provided on the rear side of the cover housing 220, and may be fixed to be protected by a protection panel 223.

Multiple beamers 243 may be installed at the back of the BB substrate 240 in order to enable beamforming in a desired direction. The multiple beamers 243 may be seated in beamer seated grooves 213 formed in the rear-side board installation space 270 of the main housing 210 in a groove shape, and can thermally directly conduct, to the main housing 210, heat generated when the multiple beamers 243 operate, thus efficiently dissipating heat through the multiple main housing heat dissipation pins 211 integrated and provided on the rear side of the main housing 210.

Furthermore, the rear correspondence socket parts 247A to which the rear end socket parts 301 provided at the rear end parts of the connecting card 300A are connected through pins, respectively, may be provided at the left end part and right end part of the BB substrate 240.

However, FIGS. 6 to 9 relate to a configuration regarding the connecting card 300A according to the first embodiment. A configuration of the connecting card 300B according to the second embodiment for which reference is made in FIGS. 1*b*, 2*b* and 3*b* has the following differences.

That is, as reference is made to FIGS. 1*b*, 2*b* and 3*b*, control unit-side card penetration holes 227B may be formed in a left surface and right surface of the antenna housing 110, respectively, so that the rear end socket parts 302 provided at the rear end parts of the connecting card 300B are introduced into the main housing 210 through the main housing 210 in a horizontal direction. The rear correspondence socket parts 247B may be provided in a left surface and right surface of the BB substrate 240 among the mother boards 230 and 240 so that the rear end socket parts 302 provided as a pair and provided at the respective rear end parts of the connecting card 300B are connected thereto in the horizontal direction through pins.

According to the multi-input and multi-output antenna apparatus 1A, 1B configured as above according to an embodiment of the present disclosure, there are advantages in that heat generated from electric elements within the front-side board installation space 170 on the side of the antenna unit 100 can be efficiently dissipated into the space between the antenna unit 100 and the control unit 200 isolated from the antenna unit 100 at a given distance toward the rear side of the antenna unit 100 through the multiple heat dissipation pins 111 integrated and formed with the back of the antenna housing 110 and heat generated from electric elements within the rear-side board installation space 270 on the side of the control unit 200 can be efficiently dissipated into the space between the control unit 200 and the antenna unit 100 isolated from the control unit 200 at a given distance toward the front side of the control unit 200 through the cover housing heat dissipation pins 221 integrated and formed with the front of the cover housing 220 and through the main housing heat dissipation pins 211 integrated and formed in the back of the main housing 210.

Furthermore, there is an advantage in that calibration control by the control unit 200 can be easily performed by adopting the structure in which a connection for power feeding and a control signal between the antenna unit 100 and the control unit 200 isolated from each other in forward and backward directions thereof at a given distance is stably performed by using the connecting card 300A, 300B as described above.

The multi-input and multi-output antenna apparatus according to an embodiment of the present disclosure has been described above in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides multi-input and multi-output antenna apparatus including the power supply module having excellent compatibility and applicability.

The invention claimed is:

1. A multi-input and multi-output antenna apparatus comprising:

an antenna unit in which an antenna substrate having multiple electric elements provided on one surface or another surface thereof and a transmission and reception substrate are stacked and disposed in forward and backward directions thereof;

a control unit in which a power supply unit (PSU) substrate having multiple electric elements provided on one surface or another surface thereof and a baseband (BB) substrate are stacked and disposed in forward and backward directions thereof and which is provided to enable calibration control by using a connection for power feeding and a control signal with the antenna unit; and at least one connecting card provided to enable the connection for power feeding and a control signal between the antenna unit and the control unit.

2. The multi-input and multi-output antenna apparatus of claim 1, wherein the at least one connecting card has a front end part thereof connected to the transmission and reception substrate of the antenna unit and a rear end part connected to the BB substrate of the control unit.

3. The multi-input and multi-output antenna apparatus of claim 1, wherein the at least one connecting card has a front end part coupled with the transmission and reception substrate of the antenna unit through a socket and a rear end part coupled with the BB substrate of the control unit through a socket.

4. The multi-input and multi-output antenna apparatus of claim 1, wherein:

a front end socket part having a socket terminal form and coupled with a front correspondence socket part provided in the transmission and reception substrate of the antenna unit is provided at the front end part of the at least one connecting card, and a rear end socket part having a socket terminal form and coupled with a rear correspondence socket part provided in the BB substrate of the control unit is provided at the rear end part of the at least one connecting card.

5. The multi-input and multi-output antenna apparatus of claim 4, wherein a coupling direction of each of the front correspondence socket part and the front end socket part, and the rear correspondence socket part and the rear end socket part is forward and backward directions.

6. The multi-input and multi-output antenna apparatus of claim 5, wherein the at least one connecting card is assembled in a form in which the front end socket part is coupled with the front correspondence socket part of the antenna unit and the rear end socket part is then coupled with the rear correspondence socket part of the control unit.

7. The multi-input and multi-output antenna apparatus of claim 5, wherein:

the antenna unit further comprises an antenna housing having the antenna substrate and the transmission and reception substrate stacked and disposed therein and a radome panel shielding a front of the antenna housing, the control unit further comprises a main housing having the PSU substrate and the BB substrate stacked and disposed therein and a cover housing shielding a front of the main housing, antenna unit-side card penetration holes through which the front end part of the at least one connecting card penetrates in forward and backward directions thereof are formed in a back of the antenna housing, and control unit-side card penetration holes through which the rear end part of the at least one connecting card penetrate in forward and backward directions thereof are formed in a front of the cover housing.

8. The multi-input and multi-output antenna apparatus of claim 4, wherein a coupling direction of each of the front correspondence socket part and the front end socket part, and the rear correspondence socket part and the rear end socket part is a horizontal direction.

9. The multi-input and multi-output antenna apparatus of claim 8, wherein the at least one connecting card is assembled in a form in which the front end socket part and the rear end socket part are simultaneously coupled with the front correspondence socket part of the antenna unit and the rear correspondence socket part of the control unit.

10. The multi-input and multi-output antenna apparatus of claim 8, wherein:

the antenna unit further comprises an antenna housing having the antenna substrate and the transmission and reception substrate stacked and disposed therein and a radome panel shielding a front of the antenna housing, the control unit further comprises a main housing having the PSU substrate and the BB substrate stacked and disposed therein and a cover housing shielding a front of the main housing, antenna unit-side card penetration holes through which front end socket parts provided in the front end part of the at least one connecting card penetrate in a horizontal direction, respectively, are formed in a side of the antenna housing, and control unit-side card penetration holes through which rear end socket parts provided in the rear end part of the at least one connecting card penetrate in the horizontal direction, respectively, are formed in a side of the main housing.

11. The multi-input and multi-output antenna apparatus of claim 1, wherein:

the antenna unit further comprises an antenna housing in which the antenna substrate and the transmission and reception substrate are stacked and disposed in a front-side board installation space provided in a front thereof and multiple heat dissipation pins are integrated and formed in a back thereof, the control unit further comprises a main housing in which the PSU substrate and the BB substrate are stacked and disposed in a rear-side board installation space provided in a front thereof; and a cover housing in which multiple cover housing heat dissipation pins are integrated and formed in a front thereof in a way to shield the front, and the at least one connecting card is provided to connect the transmission and reception substrate and the BB substrate between the antenna housing and the cover housing isolated from each other at a given distance.

12. The multi-input and multi-output antenna apparatus of claim 11, wherein:

a front-side card slot boss part provided to more backward protrude than the multiple heat dissipation pins and an antenna unit-side card penetration hole penetrating the front-side card slot boss part in forward and backward directions thereof are formed in the antenna housing, a rear-side card slot boss part provided to more forward protrude than the cover housing heat dissipation pins and a control unit-side card penetration hole penetrating the rear-side card slot boss part in forward and backward directions thereof are formed in the cover housing, and the at least one connecting card has a front end part inserted into the antenna unit-side card penetration hole through the antenna unit-side card penetration hole in forward and backward directions thereof, and has a rear end part inserted into the control unit-side card penetration hole through the control unit-side card penetration hole in forward and backward directions thereof.

13. The multi-input and multi-output antenna apparatus of claim 12, wherein the at least one connecting card is disposed to be hidden from an outside by the front-side card slot boss part having the antenna unit-side card penetration hole provided therein and the rear-side card slot boss part having the control unit-side card penetration hole provided therein.

14. The multi-input and multi-output antenna apparatus of claim 11, wherein:

an antenna unit-side card penetration hole penetrating the antenna housing in the horizontal direction is formed in a side of the antenna housing, a control unit-side card penetration hole penetrating the main housing in the horizontal direction is formed in a side of the main housing, and a front end socket part provided at the front end part of the at least one connecting card is inserted into the antenna unit-side card penetration hole through the antenna unit-side card penetration hole in the horizontal direction, and a rear end socket part provided at the rear end part of the at least one connecting card is inserted into the control unit-side card penetration hole through the control unit-side card penetration hole in the horizontal direction.

15. The multi-input and multi-output antenna apparatus of claim 14, wherein the at least one connecting card is disposed on the side of the antenna housing and the side of the main housing in a way to be externally exposed.

* * * * *